74-411.5

Examiner

Reissue

March 26, 1935.

L. E. ZERBE

ROTARY MACHINE

Re. 19,510

Orig: 1,976,207

Original Filed Feb. 4, 1933 3 Sheets-Sheet 1

Inventor

Lewis Emanuel Zerbe

By Lyon & Lyon

Attorneys

March 26, 1935. L. E. ZERBE Re. 19,510

ROTARY MACHINE

Original Filed Feb. 4, 1933 3 Sheets-Sheet 2

Inventor

Lewis Emanuel Zerbe

By Lyon & Lyon

Attorneys

March 26, 1935. L. E. ZERBE Re. 19,510

ROTARY MACHINE

Original Filed Feb. 4, 1933 3 Sheets-Sheet 3

Inventor

Lewis Emanuel Zerbe

By Lyon & Lyon

Attorneys

255. EARTH BORING.

Reissued Mar. 26, 1935

Re. 19,510

UNITED STATES PATENT OFFICE 19,510

ROTARY MACHINE

Lewis Emanuel Zerbe, Moneta, Calif., assignor, by mesne assignments, to The National Superior Company, Toledo, Ohio, a corporation of Delaware Original No. 1,976,207, dated October 9, 1934, Serial No. 655,212, February 4, 1933. Application for reissue February 5, 1935, Serial No. 5,098

23 Claims. (Cl. 255—23)

This invention relates to a rotary machine as used in a rotary drilling rig for drilling oil or other wells, and is more particularly related to a rotary machine of fully enclosed type so constructed as to meet the demands of the present deep drilling operations.

This invention is directed particularly to an improvement over the enclosed type of rotary machine as illustrated in the co-pending application of David S. Faulkner, Allen Erwin Rice and Lewis E. Zerbe, Serial No. 504,758, filed December 26, 1930.

An object of this invention is to provide a rotary machine having a unitary enclosed pinion shaft assembly including an improved form of pinion shaft lock fully enclosed within a housing and including a pair of locking pawls pivotally mounted upon a common axis and operable from without the housing by independent levers connected with the separate pawls of the pinion shaft lock.

Another object of this invention is to provide a rotary machine of fully enclosed type having a unitary pinion shaft assembly including a pinion shaft bearing mounting of the axially adjustable type in which the applied end-thrust transmitted to the pinion shaft does not react against the end of the housing which contains the adjusting means for the bearing mounting.

Another object of this invention is to provide a rotary machine of fully enclosed type including the unitary pinion shaft assembly in which the bearing means provided is of the axially adjustable type in which the adjusting means is positioned within the housing for the unitary pinion shaft so as to be non-accessible while the rotary machine is in operation.

Another object of this invention is to provide a rotary machine with an improved upthrust bearing adjusting ring on the rotary table which is rigidly clamped to the table to prevent any wear between the engaging threads and at the same time maintain a seal to retain the lubricant in the upthrust bearing positioned between the base and the rotary table.

Other objects and advantages of this invention it is believed will be apparent from the following detailed description of a preferred embodiment thereof as illustrated in the accompanying drawings.

Figure 1:
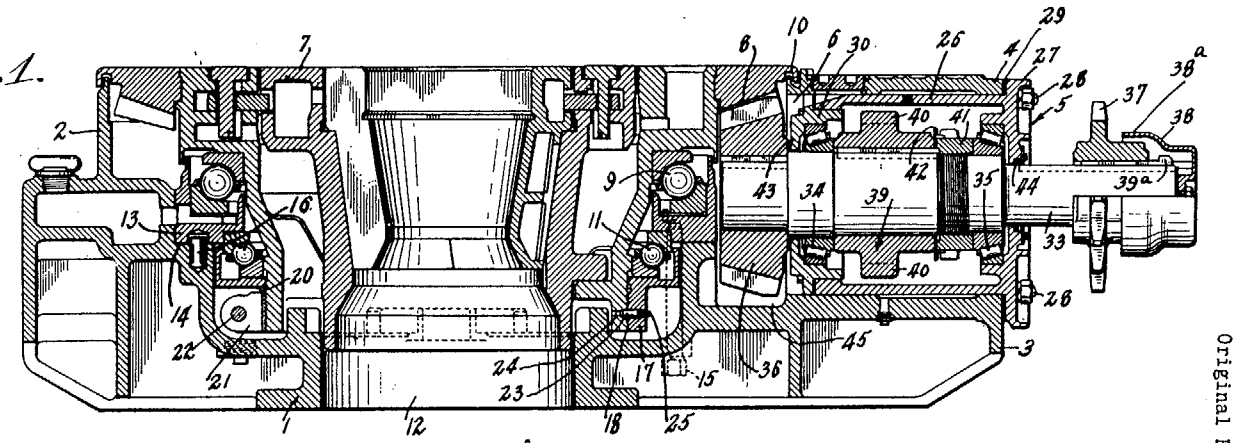
Figure 1 is a side elevation principally in vertical midsection of the rotary machine embodying my invention.
Figure 2:
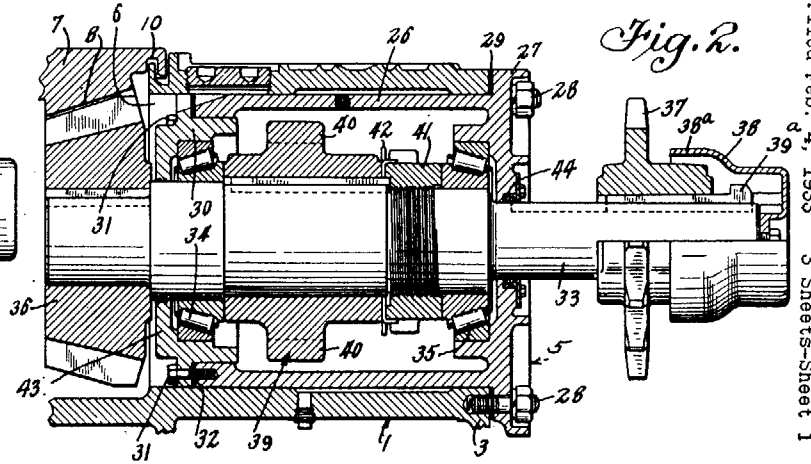
Figure 2 is an enlarged sectional elevation showing the pinion shaft assembly mounted in the base of the rotary machine embodying my invention.
Figure 3:
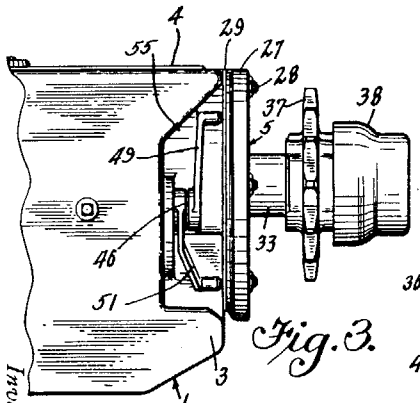
Figure 3 is a fragmental elevation of the sprocket end of the rotary machine embodied in my invention.

In the preferred embodiment of my invention as illustrated in the accompanying drawings, 1 indicates the base of a rotary machine which includes an annular upstanding wall 2 and outwardly extending pinion shaft supporting portion 3 which is preferably so formed as to provide an integral housing 4 for the unitary pinion shaft assembly 5. The upstanding wall 2 of the rotary machine is formed with an opening 6 which aligns with the chamber formed within the housing 4 and provides an opening through which the pinion 36 of the unitary pinion shaft assembly 5 may be passed to mesh with the ring gear 8 of the rotary gear table 7.

The rotary gear table 7 is rotatably mounted upon the base 1 on main bearings 9 mounted within the chamber formed by the upstanding wall 2 of the base 1.

A groove 10 is formed within ring gear 8 which cooperates with the upper end of the annular wall 2 to form a complete enclosure for the gears and bearings within the rotary machine base 1. An upthrust bearing 11 is mounted below the main bearing 9 to take the upthrust that may be applied to the rotary table 7.

The main and upthrust bearings 9 and 11 cooperate to provide a radial bearing for the gear table and maintain its axial alignment with the opening 12 at the base 1. The stationary portions of bearings 9 and 11 are mounted upon a removable bearing ring 13 positioned within the base 1 on a shoulder 14. The ring 13 is secured within the body by means of a plurality of bolts 15, only one of which is illustrated. The bolts are positioned radially around the structure of the base of the rotary machine. The ring 13 is held in erect position and prevented from rotation by means of a dowel 16 by which it is aligned in position so that the bolts 15 may be positioned to secure the ring 13.

An upthrust bearing ring 17 is threadedly secured to the lower portion of the table skirt at 18 and is adjusted to maintain the desired bearing clearance between the bearings 9 and 11. By this construction as thus set forth, the entire bearing assembly consisting of the table 7, bearings 9 and 11, and rings 13 and 17, are removable as a unit from the rotary machine when the bolts 15 are removed.

Figure 10:
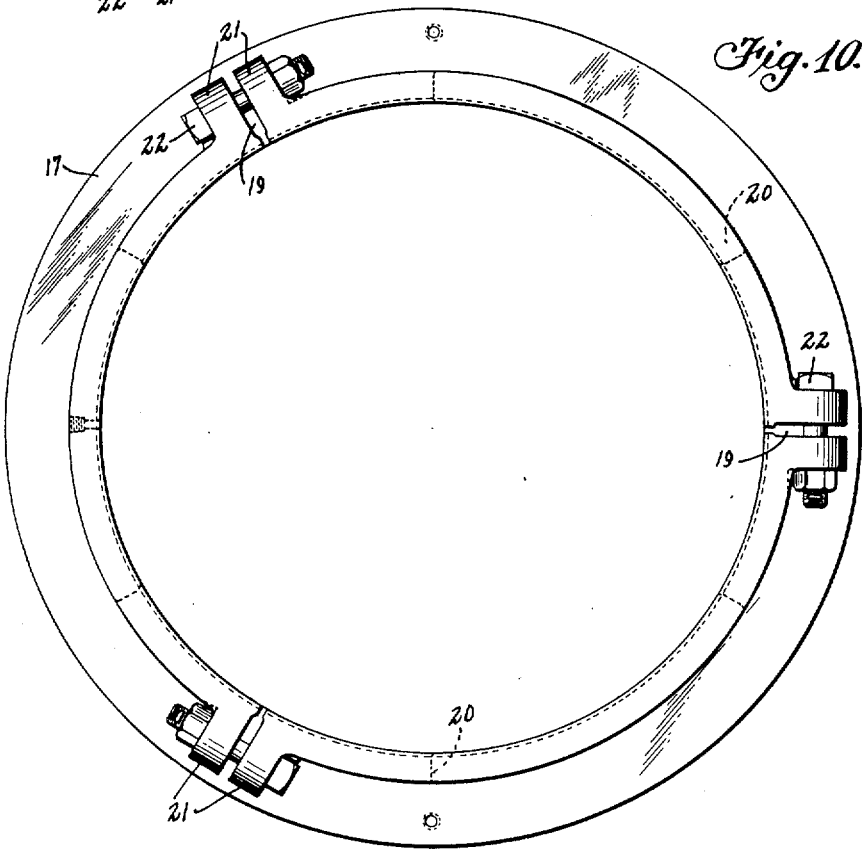
Figure 10 is a bottom plan view of the upthrust bearing adjusting ring.

In order to prevent wear between the engaging threads of the adjusting ring 17 and the table 7, I split the ring 17 from a portion of its thread length as indicated at 19 (Figure 10). In order to provide the necessary flexibility to obtain the necessary clamping action, I provide circumferential slots 20 which extend laterally to each side of the slots 19. Lugs 21 are provided on each side of the slots 19 through which bolts 22 are passed for clamping the lugs and consequently clamping the lower portion of the threaded ring 17 in tight engagement with the lower complementary threaded section on the rotary table 7. The threaded portion of the ring 17 above the slotted portion provides a complete annular seal between the ring 17 and the table 7 which prevents any loss of lubricant contained in the reservoir formed between the ring and table.

A dowel 23 fits within a hole 24 in the ring 17 and table 7 to provide an additional means to prevent any relative rotation between the table 7 and the ring 17. A threaded plug 25 is threaded in the hole 24 to prevent dislodgment of the dowel 23.

While in the drawings I have illustrated the rotary machine as of the make-and-break type constructed substantially in accordance with Letters Patent Nos. 1,596,569 and 1,782,769, it is to be understood that my invention is not in any way limited to this particular type or construction of rotary machine, but may be applied with equal advantage to all of the well known types of rotary well drilling machines.

The pinion shaft assembly embodied in my invention is preferably of the following construction and includes a bearing sleeve housing 26 fitted within the housing 4 and having an integrally formed flange 27 at its outer end by means of which the bearing housing 26 is secured to the end of the housing 4 by means of stud bolts 28. Shims 29 are positioned between the flange 27 and the end of the housing 4 to adjust the axial position of the pinion shaft assembly with respect to the base, and hence to adjust the position of the pinion 36 with respect to the gear ring 8.

A bearing sleeve housing cap 30 is secured to the inner end of the bearing sleeve housing 26 with studs 31. Shims 32 are interposed between the cap 30 and the inner end of the bearing sleeve housing 26 to provide for adjustment of the cap 30 with relation to the sleeve housing 26.

The pinion shaft 33 of the pinion shaft assembly 5 is rotatably supported within the cap 30 and within the bearing sleeve housing 26 on bearings 34 and 35, which bearings are of the axially adjustable type. A pinion 36 is keyed to the inner end of the pinion shaft 33 and a driving sprocket 37 is keyed to the outer projecting end of the pinion shaft 33 beyond the flange 27 of the sleeve housing 26. A protector 38 is secured on the end of the shaft to protect the operator from the rotating key 39*a* provided for releasably securing the sprocket 37 to the shaft 33. Sprocket 37 is axially adjustable on the pinion shaft in order to be aligned correctly with the driving sprocket of a rotary drawworks. In order to conceal the head of the sprocket key, the protector 38 is formed with a sleeve 38ª which projects over the hub of the sprocket 37 to conceal the key 39ª and also prevent ropes or cables or other matter from becoming caught between the sprocket hub and the key protector.

Mounted on the pinion shaft 33 within the bearing sleeve 26 and between the bearings 34 and 35 is a lock ring 39 having radially projecting lock lugs 40. To locate the bearings 34 and 35 with respect to the shaft 33, the bearing assembly 5 includes a collar 41 which is threaded on the pinion shaft 33 and locked against rotation by means of a lock washer 42. The lock washer 42 is located between the end of the threaded collar 41 and the end of the lock ring 40.

The bearing sleeve cap 30 is preferably provided with an inwardly projecting flange 43 which seals against the pinion shaft 33 and the bearing sleeve 26 is formed so that the flange 27 projects inwardly to the shaft 33 and is packed by means of packing 44 to the pinion shaft 33. By means of the structure thus described, the bearings 34 and 35 are completely housed within the bearing sleeve housing 26 against the entrance of foreign matter into the bearings from either the sprocket or pinion ends of the pinion shaft assembly. The inner flange 43 prevents gear oil from the pinion lubricant reservoir 45 mixing with the bearing oil within the bearing sleeve housing 26 and vice versa. This is a very desirable feature when different grades of lubricants are used for the bearings and gears.

The axial end thrust applied to the shaft 33 from the bevel pinion 36 is transmitted from the shaft 33 to the collar 41 and thence through the combined radial and thrust bearing 34 to the inwardly projecting portion of the end flange 27 of the bearing sleeve housing 26. The adjustment for the bearings 34 and 35 is provided at the inner end of the housing by means of the shims 32 positioned between the bearing sleeve housing cap 30 and the bearing sleeve housing 26.

When the rotary machine is assembled, the adjusting means are thus concealed within the rotary machine and can not be accidentally disturbed in the event that the operator attempts to make minor adjustments on the rotary machine when in service.

Bearings of the type shown in the drawings require a very high degree of precision in their adjustment and it has been observed in practice that the adjustment of bearings of this type is sometimes attempted by unskilled operators when the adjusting means are exposed during operation of the rotary machine.

In some districts it is the practice to stack the drill pipe on the derrick floor between the rotary machine and the drawworks and it has been found very difficult to operate the locking pawl on that side of the conventional rotary machine.

In order to make the locking pawls easily accessible, I provide both locking pawls on that side of the rotary opposite to the side on which the drill pipe is customarily stacked. In order to provide for this, I prefer to form the locking pawl structure preferably in the manner hereinafter set forth.

Figure 4:
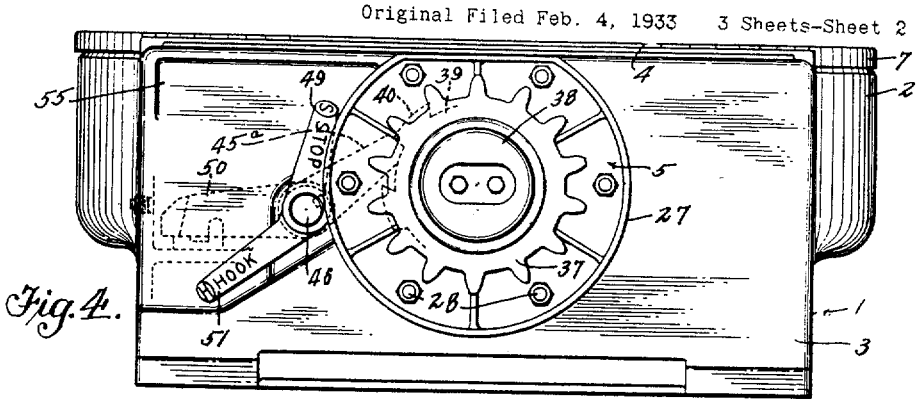
Figure 4 is an end elevation of the rotary machine embodying my invention taken from the pinion shaft end.
Figure 5:
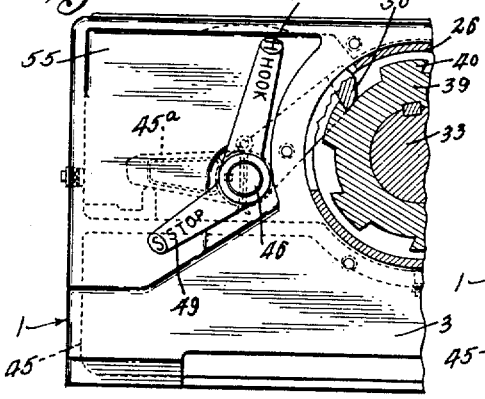
Figure 5 is a fragmental end elevation partly in section illustrating the pinion shaft lock means embodied in my invention and illustrating one lock pawl in engagement with the locking ring to hold the pinion shaft from clockwise rotation.
Figure 6:
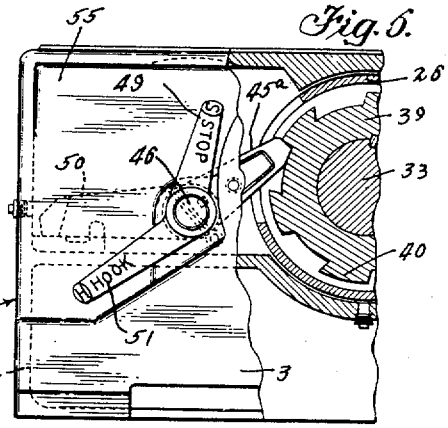
Figure 6 is a view similar to Figure 5 illustrating the other lock pawl in engagement with the lock ring to hold the pinion shaft from counterclockwise rotation.

The locking pawl 45ª for locking the pinion shaft 33 in a counter-clockwise position is keyed and pinned to the locking pawl shaft 46. The locking pawl shaft 46 is rotatably mounted in an enclosed chamber 47 formed in the outwardly extending housing 3 on the base 1. An opening 48 through the housing 3 communicates the chamber 47 with the interior of the bearing housing sleeve 6. An operating lever 49 is secured to the locking pawl shaft 46 by any suitable or desirable means such, for example, as welding the lever thereto. The locking pawl 45ª is normally out of engagement with the lock ring 39 as illustrated in Figure 5. To lock the pinion shaft against rotation in a counter-clockwise direction, it is only necessary to throw the lever 49 to the position shown in Figures 4 and 6, which operation brings the locking pawl 45ª in engagement with the advancing face of the radial lugs 40.

Figure 7:
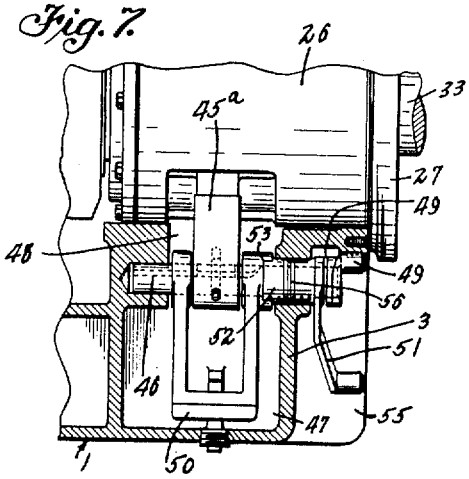
Figure 7 is a fragmental sectional view illustrating the mounting and positioning of the locking pawls embodied in my invention.
Figure 8:
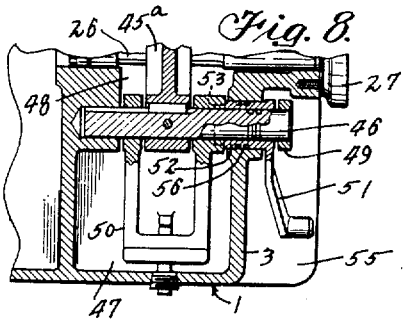
Figure 8 is a fragmental sectional view showing the locking pawl mounted partially in horizontal section.
Figure 9:
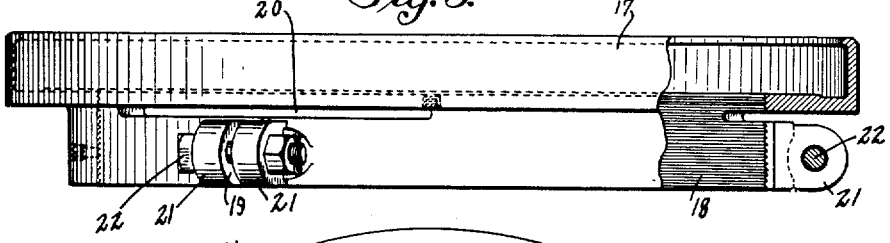
Figure 9 is a side elevation partly in vertical section showing the upthrust bearing adjusting ring embodied in my invention.

The center of mass of the pawl 45ª and lever 49 is so situated as to produce a clockwise turning movement about the shaft 46 and consequently maintain the locking pawl 45ª in engaged position. The center of mass is also so situated that when the locking pawl 45ª is rotated to non-engaged position, the tendency is to rotate in the counter-clockwise direction to maintain the locking pawl 45ª out of engagement. The locking pawl 50 for locking the pinion shaft 33 against rotation in a clockwise direction is journaled upon shaft 46 and straddles the pawl 45ª and is in the form of a hook type locking pawl which engages the retreating face of a radial lug 40 on the lock ring 39. The pawls 45ª and 50 are assembled within the chamber 47 through the opening 48 when the pinion shaft assembly 5 is removed from the housing 6. To rotate the pawl 50 from without the rotary machine or from the outside of the housing 3, I provide a lever 51 which is journaled within the wall of the housing 3 and provides a bearing for one end of the shaft 46. The inner face of the sleeve portion 52 of the lever 51 has a clutch face 53 which engages a complementary clutch face formed on the adjacent hub of the pawl 50 for operating the pawl 50 by means of the lever 51. The pawl 50 is shown in normal disengaged position in Figures 6, 7 and 8, and is shown in engaged position in Figure 5.

The center of mass in the pawl 50 and lever 51 is so located as to hold the pawl in engagement with the locking ring 39 when rotated to locking position and to hold the pawl 51 from engagement with the locking ring 39 when rotated to non-locking position.

The housing 3 formed at the outward portion of the base 1 of the rotary machine is formed on the side occupied by the locking pawls 45ª and 50 to provide a recess 55 in which the locking pawl levers 49 and 51 are located. This recess provides a readily accessible location for the lock pawl levers but further protects these levers against breakage and accidental actuation when the rotary machine is in use.

In order to maintain lubricant within the housing 3, I prefer to form the sleeve portion 52 of the lever 51 to provide packing groove 56 within which any suitable form of packing may be positioned to prevent leakage of lubricant from the housing 3 at this point.

The rotary machine thus embodied in my invention is illustrated as including the unitary type of assembly carried as a unit on the rotary table 7. This structure, however, forms no part of my invention and is not therefore claimed by me but is the invention of another upon which a further application is being filed. The invention which I have made in the rotary machine herein disclosed is limited to the features of the unitary pinion shaft assembly 5 and its manner of construction and mounting and to the manner of construction and mounting of the upthrust bearing ring 17 and the particular form of pawl lock means illustrated as provided in connection with the unitary pinion shaft assembly.

Having fully described my invention, it is to be understood that I do not wish to be limited to the details herein set forth, but my invention is of the full scope of the appended claims.

I claim:

1. In a rotary machine, the combination of a base, a rotary table having a gear ring rotatably mounted on the base, a pinion shaft housing formed integral with the base extending outwardly from the rotary table, a pinion shaft assembly mounted to extend outwardly of the base within the housing, said pinion shaft assembly including a pinion shaft, a pinion secured thereto to engage the gear ring, a bearing sleeve housing enclosing the pinion shaft having closure flanges at its opposed ends to form a chamber around the pinion shaft, bearings mounted within the chamber adjacent said flanges for supporting the pinion shaft, and a lock means for the pinion shaft mounted within the housing between the said bearings.

2. In a rotary machine, the combination of a base, a rotary table having a gear ring rotatably mounted on the base, a pinion shaft housing formed integral with the base extending outwardly from the rotary table, a pinion shaft assembly mounted to extend outwardly of the base within the housing, said pinion shaft assembly including a pinion shaft, a pinion secured thereto to engage the gear ring, a bearing sleeve housing enclosing the pinion shaft having closure flanges at its opposed ends to form a chamber around the pinion shaft, and bearings mounted within the chamber adjacent said flanges for supporting the pinion shaft, means removably securing the outer of said flanges to the housing formed integral with the base, and a lock means for the pinion shaft mounted within the housing between the said bearings.

3. In a rotary machine, the combination of a base, a rotary table having a gear ring rotatably mounted on the base, a pinion shaft housing formed integral with the base extending outwardly from the rotary table, a pinion shaft assembly mounted to extend outwardly of the base within the housing, said pinion shaft assembly including a pinion shaft, a pinion secured thereto to engage the gear ring, a bearing sleeve housing enclosing the pinion shaft having closure flanges at its opposed ends to form a chamber around the pinion shaft, bearings mounted within the chamber adjacent said flanges for supporting the pinion shaft, and means within the bearing sleeve housing for adjusting the bearings axially of the pinion shaft.

4. In a rotary machine, the combination of a base, a rotary table having a gear ring rotatably mounted on the base, a pinion shaft housing formed integral with the base extending outwardly from the table, a pinion shaft assembly mounted to extend outwardly of the table within the housing, said pinion shaft assembly including a pinion shaft, a pinion secured thereto to engage the gear ring, a sleeve having a closure flange at its outer end and a sleeve cap at its inner end forming a chamber around the pinion shaft, said sleeve being adapted to fit within the housing formed integrally with the base, bearings mounted within the chamber thus formed within the bearing sleeve housing, and means for removably securing the flange of the bearing sleeve housing to the rotary base housing so that on removal of the latter said means the pinion shaft assembly may be removed from the rotary machine axially of the rotary table and as a unit, and a lock means for the pinion shaft mounted within the housing between the said bearings.

5. In a rotary machine, the combination of a base having a vertically extending opening therein, and having an outwardly extending pinion shaft supporting portion, a rotary table rotatably mounted in said opening, a pinion shaft bearing sleeve housing supported by the pinion shaft supporting portion of the base, a pinion shaft rotatably supported within the housing, drive means carried by the shaft and adapted to drive the rotary table, a lock ring non-rotatably mounted on the shaft within the housing, a lock pawl shaft mounted on the base, a lock pawl secured to said shaft, a second lock pawl rotatably mounted on said shaft, one of said locking pawls adapted to engage the lock ring to hold the pinion shaft from rotation in one direction, and the other of said locking pawls being adapted to hold the pinion shaft from rotation in the other direction, and means to selectively operate said pawls into and out of engagement with said lock ring.

6. In a rotary machine, the combination of a base having a vertically extending opening therein, and having an outwardly extending pinion shaft supporting portion, a rotary table rotatably mounted in said opening, a pinion shaft assembly including a pinion shaft, drive means carried by the shaft and adapted to drive the rotary table, a bearing sleeve housing, means to support said housing on the pinion shaft supporting portion of the base, means at the opposed ends of the bearing sleeve housing to form an enclosed chamber around the shaft, bearings mounted at the opposed ends of said chamber, locking means mounted within the chamber, and means adapted to extend from the exterior of the bearing sleeve into said chamber to engage the locking means to hold the pinion shaft from rotation in either direction.

7. In a rotary machine, the combination of a base having a vertically extending opening therein, and having an outwardly extending pinion shaft supporting portion, a rotary table rotatably mounted in said opening, a pinion shaft assembly including a pinion shaft, means to rotatably support said shaft from the pinion shaft supporting portion of the base, drive means carried by the shaft and adapted to drive the rotary table, lock means non-rotatably mounted on said shaft, two locking pawls positioned to one side of the pinion shaft, means to rotatably support said lock pawls on a common axis, one of said lock pawls adapted to engage the lock means to hold the pinion shaft from rotation in one direction, and the other of said lock pawls being adapted to hold the pinion shaft from rotation in the other direction, and means to selectively operate said pawls into and out of engagement with said lock means.

8. In a rotary machine, the combination of a base having a vertically extending opening therein, and having an outwardly extending pinion shaft supporting portion, a rotary table rotatably mounted in the opening in said base, a pinion shaft assembly including a pinion shaft, means to rotatably support said shaft on the pinion shaft supporting portion of the base, drive means carried by the pinion shaft to drive the rotary table, lock means non-rotatably mounted on the pinion shaft, a lock pawl shaft positioned parallel to said pinion shaft, means to support the lock pawl shaft, a lock pawl mounted on the lock pawl shaft, a hook lock pawl rotatably mounted on the lock pawl shaft and straddling the first mentioned pawl, one of said locking pawls being adapted to engage the lock means to hold the pinion shaft from rotation in one direction, and the other of said locking pawls being adapted to engage the lock means to hold the pinion shaft from rotation in the other direction, and means to selectively operate said pawls into and out of engagement with said lock means.

9. In a rotary machine, the combination of a base having a vertically extending opening therein, and having an outwardly extending pinion shaft supporting portion forming a housing, a rotary table rotatably mounted in said opening in the base, a pinion shaft assembly mounted within the housing of the base including a pinion shaft assembly rotatably supported by spaced bearings within said housing, means carried by the pinion shaft to drive the rotary table, lock means non-rotatably mounted on said shaft within the housing, two pinion shaft lock pawls mounted on a common axis within said housing to one side of said pinion shaft and adapted to be selectively engaged in said lock means.

10. In a rotary machine, the combination of a base having a vertically extending opening therein, and having an outwardly extending pinion shaft supporting portion forming a pinion shaft assembly housing, a rotary table rotatably mounted in said opening, a pinion shaft assembly mounted within the housing including a pinion shaft, spaced bearings within the housing for rotatably supporting the pinion shaft, means carried by the pinion shaft to drive the rotary table, a lock ring non-rotatably mounted on the pinion shaft within the housing, selective locking means within the housing to engage the lock ring and prevent rotation of the pinion shaft in either direction, said selective locking means including a plurality of locking members mounted on a common axis, and means extending through the housing for selectively operating the selective locking means from the exterior of said housing.

11. In a rotary machine, the combination of a base having a vertically extending opening therein, and having an outwardly extending pinion shaft supporting portion forming a pinion shaft housing, a rotary table rotatably mounted in the opening in said base, a pinion shaft rotatably supported by spaced bearings within said housings and adapted to drive the rotary table, a lock ring non-rotatably mounted on the shaft within the housing, selective locking means within the housing to engage the lock ring and prevent rotation of the pinion shaft in either direction, said selective locking means being mounted on a common axis, and means extending through the housing for the selective and independent operation of the selective locking means from the exterior of the housing.

12. In a rotary machine, the combination of a base having a vertically extending opening therein, and having an outwardly extending pinion shaft supporting portion forming a pinion shaft housing, a rotary table rotatably mounted in the opening in the base, a pinion shaft rotatably supported by spaced bearings within said housing and adapted to drive said rotary table, a lock ring non-rotatably mounted on said shaft within the housing, selective lock means within the housing to engage the lock ring and hold the pinion shaft from rotation in either direction, said means being mounted on a common axis, means extending through the housing for selectively operating the locking means from the exterior of the housing, and the housing being formed to provide a recess in which the latter said operating means are located on the exterior of the housing.

13. In a rotary machine, the combination of a base having a vertically extending opening therein, a rotary table rotatably mounted in the opening in the base, the base being provided with an outwardly extending integral pinion shaft supporting portion, a pinion shaft housing supported by the latter said portion of the base, a pinion shaft rotatably supported within said housing, drive means carried by the shaft and adapted to drive the rotary table, a lock ring mounted on said shaft within the housing, means within the housing to engage the lock ring and hold the pinion shaft from rotation, and means extending through the housing and connected with a lever for operating the lock means from the exterior of the housing, said lever being positioned within a vertically extending recess in the vertical face of the base.

14. In a rotary machine, the combination of a base having a vertically extending annular flange, a rotary table rotatably supported by said base and cooperating with said annular flange to form a complete enclosure around said table, an opening in said flange, a cylindrical enclosure extending outwardly from said flange and having an opening coextensive with the opening in said flange, a unitary pinion shaft housing insertable into said opening, means to retain the housing in the opening, axially adjusted tapered bearings mounted within said housing to rotatably support a pinion shaft assembly including a shaft and pinion to rotate said rotary table and an adjustable cap member at the pinion end of said housing to provide axial adjustment for said bearings.

15. In a unitary pinion shaft assembly for a rotary drilling machine, the combination of a housing, an adjustable cap member, opposed axially adjusted tapered bearings mounted between the cap member and the opposite end of the housing, spacing means mounted on the shaft between the bearings, a shaft supported by the bearings, said spacing means including a collar threaded on the shaft, means to axially adjust the cap member, a drive pinion mounted on the shaft at one end, and means mounted on the other end of the shaft for driving the shaft.

16. In a unitary pinion shaft assembly for a rotary drilling machine, the combination of a housing, an adjustable cap member at one end of the housing, a pinion shaft, opposed axially adjusted tapered bearings mounted between the cap member and the opposite end of the housing for supporting the pinion shaft, spacing means mounted on said shaft between the bearings including means threaded on said shaft, means to axially adjust the cap member, a pinion mounted on one end of the shaft, means for driving the shaft at the other end, the bearings and spacing means being mounted on the shaft so as to be removable from the shaft on the end opposite to that on which the pinion is mounted.

17. In a unitary pinion shaft assembly for a rotary drilling machine, the combination of a housing having an adjustable cap member, a pinion shaft, opposed axially adjusted tapered bearings mounted between the cap member and the opposite end of the housing for rotatably supporting the pinion shaft, spacing means mounted on the said shaft including a collar threaded to the shaft and a lock ring keyed to the shaft, means to axially adjust the cap member, a drive pinion mounted on one end of the shaft, means on the other end of the shaft to drive the shaft, and means adapted to extend into the housing to engage the lock ring to hold the shaft from rotation.

18. In a rotary machine, a base, a table rotatably mounted on the base, a gear carried by the table, a drive means for driving the gear, including a pinion and a pinion shaft, means cooperating with the table and the base forming an enclosure for the gear, pinion and pinion shaft to prevent the admission of foreign matter thereto, lock means mounted within said enclosure to engage the drive means for locking the gear from rotation in both directions or in either direction, and actuating means extending exteriorly of said enclosure for selectively actuating said lock means, said selective actuating means being rotatively mounted relative to a common axis of rotation.

19. In a rotary machine, a base, a table rotatably mounted on the base, a gear carried by the table, a drive means for driving the gear, including a pinion and a pinion shaft, means cooperating with the table and the base forming an enclosure for the gear, pinion and pinion shaft to prevent the admission of foreign matter thereto, two locking pawls mounted within said enclosure to selectively engage the drive means for locking the gear from rotation in both directions or in either direction, a pair of lock pawl actuating levers positioned exteriorly of said enclosure and being independently rotatable about a common axis, and means operatively connecting each of said pawls with a separate actuating lever.

20. In a rotary machine, a base, a table rotatably mounted on the base, a gear carried by the table, a drive means for driving the gear, including a pinion and a pinion shaft, means cooperating with the table and the base forming an enclosure for the gear, pinion and pinion shaft to prevent the admission of foreign matter thereto, two locking pawls mounted within said enclosure to engage the drive means for locking the gear from rotation in both directions or in either direction, a pair of lock pawl actuating levers positioned exteriorly of said enclosure, means to actuate one of said pawls with one of said levers, said means including a shaft, the other of said levers being rotatively mounted about said shaft, and means to operatively connect the last named lever with the other of said pawls.

21. In a rotary machine, a base, a table rotatably mounted on the base, a gear carried by the table, a drive means for driving the gear, including a pinion and a pinion shaft, means cooperating with the table and the base forming an enclosure for the gear, pinion and pinion shaft to prevent the admission of foreign matter thereto, two locking pawls mounted within said enclosure to engage the drive means for locking the gear from rotation in both directions or in either direction, an actuating sleeve rotatably supported by said base, a shaft rotatably mounted within said sleeve, one of said lock pawls being rotatively supported on said shaft, clutch means operatively connecting said sleeve and said last named lock pawl, means to operatively connect said shaft with the other of said pawls, and means accessible exteriorly of said enclosure to selectively actuate said sleeve and said shaft.

22. In a rotary machine, the combination of a base, a gear ring rotatably supported by the base, a pinion shaft, means whereby said pinion shaft drives said table, a pinion shaft housing supported by said base, a bearing sleeve housing removably secured within an opening formed in said pinion shaft housing, axially spaced bearings mounted within said sleeve housing to rotatably support said shaft, a lock ring mounted on said shaft between said bearings, lock means pivotally mounted within said housing and adapted to project through an opening in said sleeve to operatively engage the lock ring, and means extending through the housing for operating the lock means from the exterior of the housing.

23. In a rotary machine, the combination of a base, a gear ring rotatably supported by the base, a pinion shaft, means whereby said pinion shaft drives said table, a pinion shaft housing supported by said base, a bearing sleeve housing removably secured within an opening formed in said pinion shaft housing, axially spaced bearings mounted within said sleeve housing to rotatably support said shaft, a lock ring mounted on said shaft between said bearings, lock means pivotally mounted within said housing and adapted to project through an opening in said sleeve to operatively engage the lock ring, and rotatable means extending through a bore in the housing for operating the lock means from the exterior of the housing.

LEWIS EMANUEL ZERBE.